US011677145B1

(12) United States Patent
Sharma

(10) Patent No.: US 11,677,145 B1
(45) Date of Patent: Jun. 13, 2023

(54) SELECTIVE TRUE-TIME DELAY FOR ENERGY EFFICIENT BEAM SQUINT MITIGATION IN PHASED ARRAY ANTENNAS

(71) Applicant: Amazon Technologies, Inc., Seattle, WA (US)

(72) Inventor: Sunny Sharma, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 17/014,698

(22) Filed: Sep. 8, 2020

(51) Int. Cl.
*H01Q 3/00* (2006.01)
*H01Q 3/26* (2006.01)
*H01Q 21/22* (2006.01)
*H04B 7/06* (2006.01)
*H01Q 3/38* (2006.01)

(52) U.S. Cl.
CPC ............ *H01Q 3/26* (2013.01); *H01Q 3/2682* (2013.01); *H01Q 3/2694* (2013.01); *H01Q 3/38* (2013.01); *H01Q 21/22* (2013.01); *H04B 7/0617* (2013.01)

(58) Field of Classification Search
CPC .......... H01Q 3/26; H01Q 3/2682; H01Q 3/38; H01Q 3/2694; H01Q 21/22; H04B 7/0617
USPC .................................................. 342/372, 368
See application file for complete search history.

(56) References Cited

U.S. PATENT DOCUMENTS

| 5,734,345 | A | * | 3/1998 | Chen ..................... H01Q 21/22 |
| | | | | 342/373 |
| 7,009,560 | B1 | * | 3/2006 | Lam ........................ H01Q 3/36 |
| | | | | 342/374 |
| 9,680,553 | B1 | * | 6/2017 | Tiebout .................... H04B 7/04 |
| 9,935,367 | B2 | * | 4/2018 | Tiebout ............... H04B 7/0408 |
| 10,141,993 | B2 | * | 11/2018 | Lee ........................ H01Q 1/243 |
| 10,256,894 | B2 | * | 4/2019 | Eitan ..................... H04B 7/086 |
| 10,594,030 | B2 | * | 3/2020 | Lee ..................... H01Q 3/2682 |
| 10,784,576 | B2 | * | 9/2020 | Iannotti ................. H01P 9/006 |
| 10,897,082 | B1 | * | 1/2021 | Legare ..................... H01Q 3/40 |
| 11,385,326 | B2 | * | 7/2022 | Völkel ............... H01Q 15/0086 |
| 2003/0043071 | A1 | * | 3/2003 | Lilly .................... H01Q 3/2605 |
| | | | | 342/368 |

FOREIGN PATENT DOCUMENTS

| WO | WO-2020239835 A1 * 12/2020 | .......... G11C 27/024 |
| WO | WO-2021121634 A1 * 6/2021 | .............. H04B 7/06 |

* cited by examiner

*Primary Examiner* — Chuong P Nguyen
(74) *Attorney, Agent, or Firm* — Lowenstein Sandler LLP

(57) ABSTRACT

Technologies directed to using selective true-time delay for energy efficient beam squint mitigation in phased array antennas in communication systems are described. One communication system includes a first register to store a first value indicative of a mode of operation of the communication system and a second register to store a value corresponding to a first time duration. The communication system includes antenna elements, digital beamforming (DBF) devices, phase shifters, and delay circuitry. In a first mode, the delay circuitry does not delay a first signal and, in a second mode, the delay circuitry delays a second signal.

20 Claims, 11 Drawing Sheets

SELECTIVE TRUE-TIME DELAY FOR ENERGY EFFICIENT BEAM SQUINT MITIGATION IN PHASED ARRAY ANTENNAS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
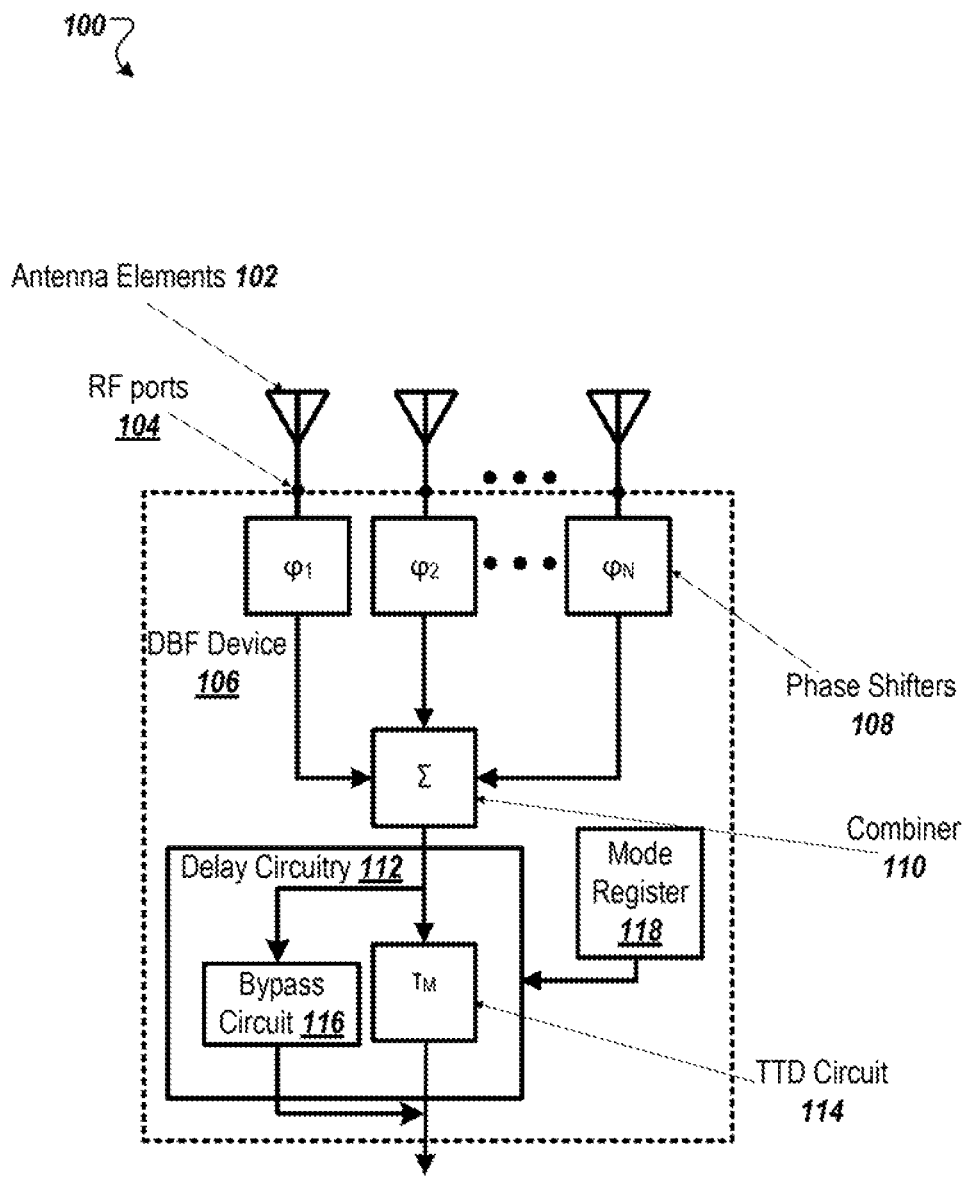
FIG. 1 is a block diagram of a communication system including antenna elements and a digital beamforming (DBF) device that includes phase shifters and a true-time delay (TTD) circuit, according to embodiments of the present disclosure.

Technologies directed to using selective true-time delay for energy efficient beam squint mitigation in phased array antennas in communication systems are described. In an electronically steered phased array, predictable beam patterns are formed by individually controlling the relative time delay or relative phase shift of the signal between each antenna element. The direction of the transmitted or received electromagnetic energy is also spatially steered by altering the relative time delays or relative phase shift between the antenna elements, resulting in constructive interference in the desired direction and destructive interference in other directions. When a beam arrives or departs at a given scan angle, each antenna element is excited with a relative time delay to the other antenna elements. For narrowband waveforms, beam steering can be accomplished by using a phase shift across the antenna elements. However, for wideband waveforms where the beam steering is produced by a phase shift, the waveforms of the beam rotate as a function of both frequency and scan angle. This frequency dependent directional shift is referred to as beam squint. As the angle from the center of a phased antenna array increases (i.e. scan angle), the impact of the beam squint increases resulting in performance loss of the antenna array.

Conventional electronically controlled phased array communication systems combat beam squint using true-time delay (TTD) elements instead of phase shifters. The use of TTD elements instead of phase shifters mitigates the errors due to beam squint. However, energy cost of realizing an accurate TTD element is significantly greater than that of an accurate phase shifter, even when implemented in the digital domain. In addition, delay resolutions supported by phase shifters can be superior compared to TTD resolutions for a given power dissipation budget. When considering a multi-beam phased array system that requires independent delay control for each beam per antenna element, implementing TTD circuits is a costly proposition for a substantially sized array. In an energy constrained phased array system, use of TTD circuits for all beams per antenna element may not be feasible.

Aspects of the present disclosure overcome the deficiencies of conventional electronically controlled phased array communication systems. The present disclosure alleviates the performance impact of beam squint while minimizing the energy cost in a large, multi-beam phased array system. Combinations of TTD circuits and phase shifters are used for dynamic beam squint mitigation by selectively enabling TTD circuits for beam scan angles suffering loss of performance from beam squint. Scan angles exceeding a threshold angle utilize TTD circuits to reduce beam squint impact, while angles below this threshold angle utilize only phase shifters for improved energy efficiency. Thus, the present disclosure may result in a wideband, energy efficient phased array communication system where the beam scan angles are spatially distributed.

FIG. 1 is a block diagram of a communication system 100 including antenna elements 102 and a digital beamforming (DBF) device 106 that includes phase shifters 108 and a true-time delay (TTD) circuit 114, according to embodiments of the present disclosure. Antenna elements 102 may be disposed in an organized formation (e.g. such as formed in a circular pattern, a rectangular pattern, a hexagonal pattern, or the like) on a circuit board or other support structure. Antenna elements 102 are coupled to the DBF device 106, such as to RF ports 104 of the DBF device 106. In particular, antenna elements 102 are coupled to phase shifters 108 of the DBF device 106 through the RF ports 104. It should be noted that FIG. 1 is a simplified illustration and the phase shifters 108 may not be directly coupled to the RF ports 104. The phase shifters 108 can be implemented in a digital domain of the DBF device 106. The phase shifters 108 are coupled to a combiner 110. Combiner 110 is coupled to delay circuitry 112. The combiner 110 can be a processing element of the DBF device 106, such as a discrete component, a discrete circuit, logic circuitry, a digital functional block, a programmable block, such as a digital signal processing (DSP) functional block, or the like. Delay circuitry 112 includes a TTD circuit 114, a bypass circuit 116, and a mode register 118. The TTD circuit 114 can be a processing element, such as a discrete component, a discrete circuit, logic circuitry, a digital functional block, a programmable block, such as a DSP functional block, or the like.

In some embodiments, a signal beam is received across an antenna array by antenna elements 102. The signal beam is transmitted through RF ports 104 to phase shifters 108. To arrive at the antenna elements 102, the incoming signal beam may comprise variable path lengths to reach individual antenna elements 102 of the antenna array. The signal beam can be a primary beam made up of several subbeams that may or may not arrive from the save direction. For example, subbeams of a signal beam propagating at 45 Degrees from nadir relative to the surface of the antenna array travel further to reach antenna elements 102 on a far side of the antenna array than to reach antenna elements on a near side of the antenna array relative to the incoming signal beam. The variable path length may result in the antenna elements 102 receiving the incoming signal beam in various phases across the antenna array. Each phase shifter 108 receives subbeams of the signal from an associated antenna element 102. A phase shifter 108 applies a phase shift to the subbeams of the incoming signal. For example, phase shifters 108 may apply a relative phase shift to each subbeam such that each signal of the total incoming signal is realigned to be in phase. The relative phase shift may be associated with the variable path length of the signal across each of the antenna elements 102. The relative phase shift for an individual phase shifter 108 may be associated with the spatial location of an associated antenna element 102 of the antenna array. In some embodiments, the relative phase shift applied by the phase shifters 108 may be associated with or coordinated with a time delay applied by delay circuitry 112.

In some embodiments, a phase shifter 108 is associated with multiple antenna elements 102. For example, a DBF device 106 may include one phase shifter 108 that is coupled to receive signals from multiple antenna elements 102 of the DBF device 106. As noted above, the phase shifter 108 is not necessarily coupled to an antenna element 102. For example, there can be a down-conversion chain, including an analog-to-digital converter, before a signal gets to the phase shifter 108. Each phase shifter 108 may shift the phase of signals received by multiple antenna elements 102. In another example, a DBF device 106 may include a phase shifter 108 for each antenna element such that each phase shifter 108 is associated only with an individual antenna element 102 of the antenna array.

As shown in FIG. 1, combiner 110 receives each of the phase compensated signals from each of phase shifters 108. Combiner 110 combines the phase compensated signals to form a combined signal that is substantially in phase. Combiner 110 sends the combined signal to delay circuitry 112.

As shown in FIG. 1, delay circuitry 112 includes a TTD circuit 114, a bypass circuit 116, and a mode register 118. The TTD circuit 114 applies a true time delay to the combined signal received from the combiner 110. The bypass circuit 116 receives and passes along the combined signal without applying a time delay. The mode register 118 stores data (e.g. a register value) to determine whether to select a path through the TTD circuit 114 or the bypass circuit 116 for the combined signal received from the combiner 110.

In some embodiments, delay circuitry 112 receives the combined signal from combiner 110. The data stored in mode register 118 is used to determine whether to select the TTD circuit 114 or the bypass circuit 116 as the data path for the combined signal. The delay circuitry 112 may be designed to selectively enable the bypass circuit 116 or the TTD circuit 114 based on the data stored in mode register 118. For example, a value stored in the mode register that is greater than a threshold value may be indicative of using the TTD circuit, whereas a value stored in the mode register less that than a threshold value may be indicative of using the bypass circuit. Alternatively, other mechanisms than a threshold value can be used to selectively enable the bypass circuit 116 or the TTD circuit 114.

In some embodiments, the mode register 118 can store data indicative of using the TTD circuit 114 or the bypass circuit 116 based on the scan angle of the incoming signal beam received by the antenna elements 102. For example, if the scan angle of the incoming signal beam is below a threshold angle, then the mode register 118 may store data indicative of using the bypass circuit 116. In another example, if the scan angle of the incoming signal beam is above a threshold angle then the mode register 118 may store data indicative of using the TTD circuit 114.

In some embodiments, mode register 118 can store data indicative of using the TTD circuit 114 or the bypass circuit 116 based on the signal strength of the signal received by the antenna elements 102. For example, if the received signal beam comprises a magnitude above a threshold magnitude the mode register can store data indicative of using the bypass circuit 116. In another example, if the received signal beam comprises a magnitude below a threshold magnitude, then the mode register 118 may store data indicative of using the TTD circuit 114.

In some embodiments, the communication system 100 may operate as a transmitter with all the elements effectively operating in reverse. For example a signal may be generated and transmitted to delay circuitry 112. The delay circuitry 112 may selectively apply a true time delay by selecting one of the TTD circuit 114 or the bypass circuit 116. The data stored in mode register 118 can be used to determine whether to select the TTD circuit 114 or the bypass circuit 116 as the data path for the combined signal. The delay circuitry 112 may be designed to selectively enable the bypass circuit 116 or the TTD circuit 114 based on the data stored in mode register 118. In the transmitter embodiment, the combiner 110 may act as a splitter which divides the signal into subbeams. Each subbeam may be transmitted to a phase shifter. The phase shifter may adjust the relative phase shift between the subbeams. The relative phase shift may be associated with a beam transmission the communication system is operating with. The phase compensated signal may then be transmitted to antenna element 102 through RF ports 104. The antenna element 102 may transmit the signal at a transmission angle. The transmission may be associated with the relative phase shifting of phase shifter 108 as well as the relative time delay of the TTD circuit 114.

Figure 2A:
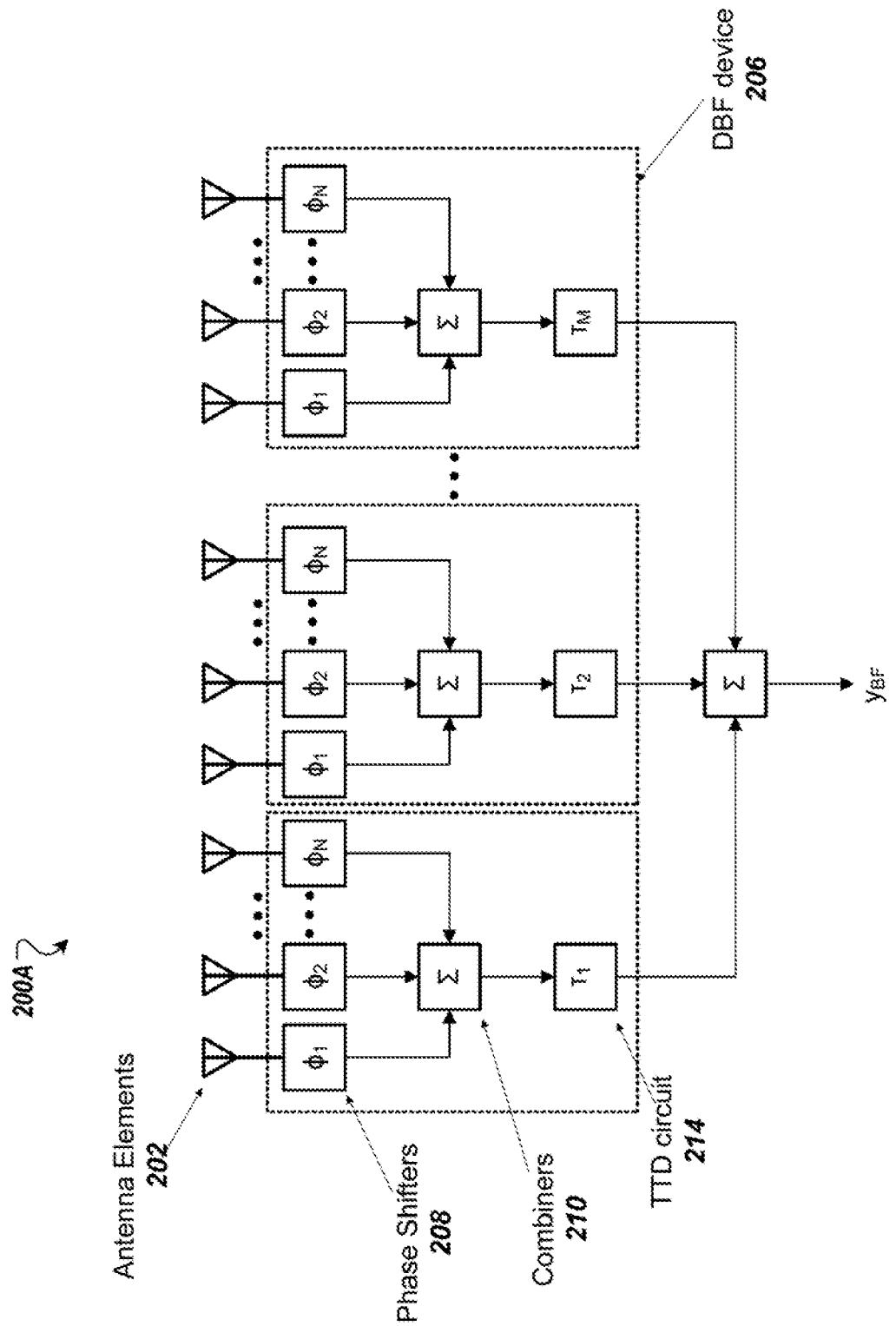
FIG. 2A-C are block diagrams of a communication system including an array antenna and one or more DBF devices with phase shifters and selective TTD circuits, according to embodiments of the present disclosure.
Figure 2B:
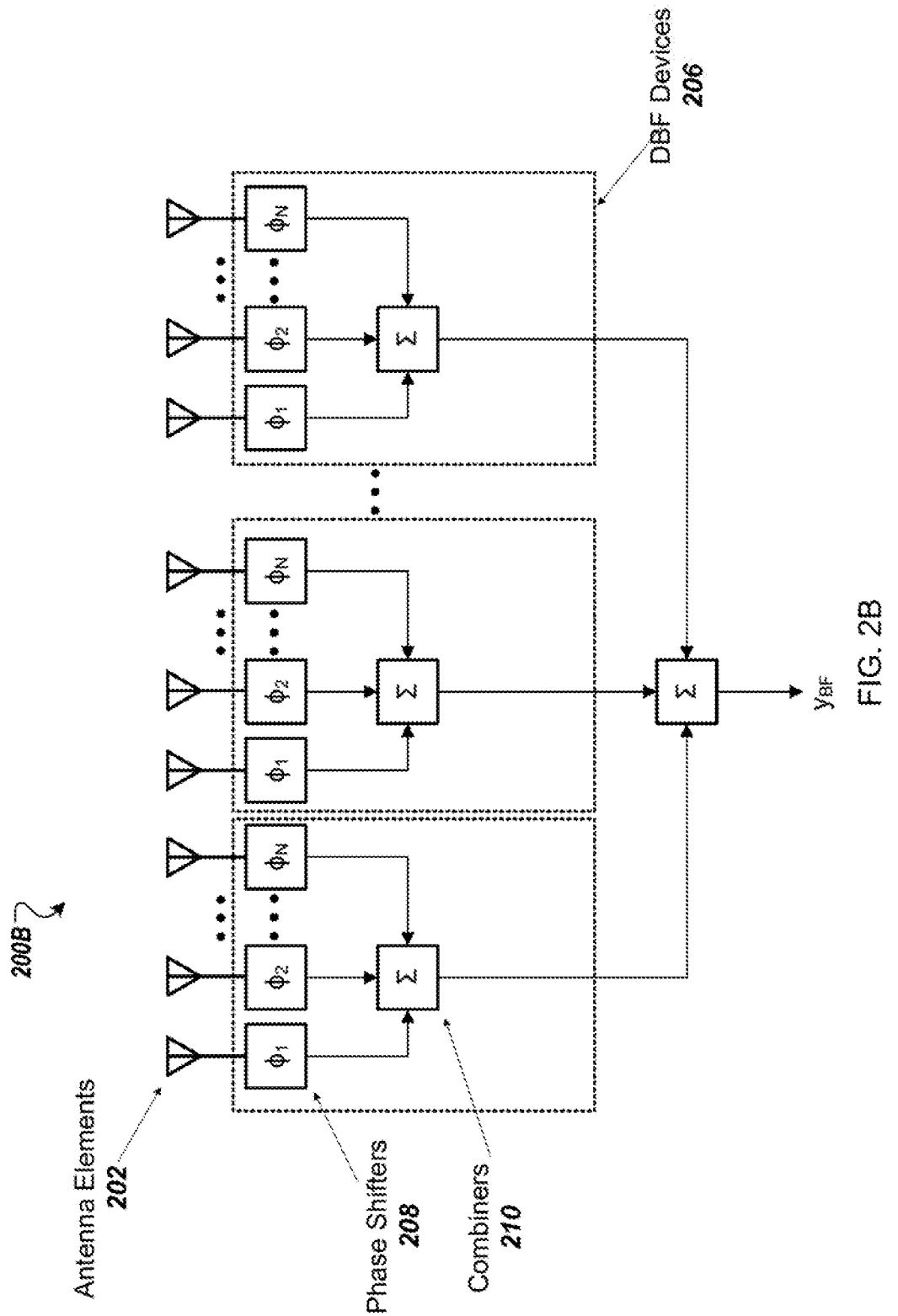
Figure 2C:
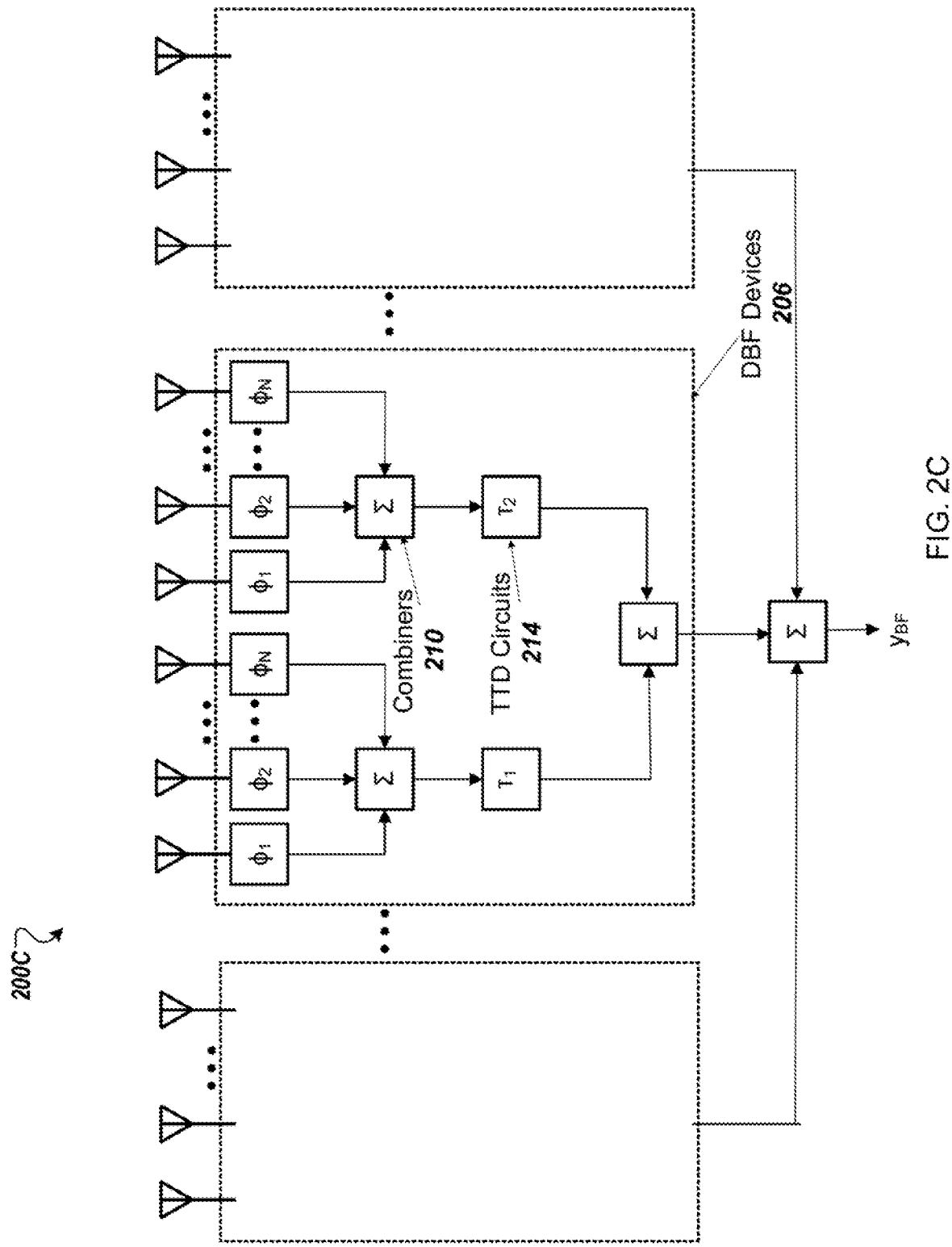

FIG. 2A-C are block diagrams of a communication system 200 including antenna elements 102 and one or more DBF devices 106 with phase shifters 208 and TTD circuits 214, according to embodiments of the present disclosure. Communication system 200 may include antenna elements 202. Antenna elements 202 may be grouped and associated with one or more DBF devices 206. Each antenna element 202 is coupled to an associated phase shifter 208. Antenna elements 202 receive a signal beam and transmit the signal to phase shifters 208. Each phase shifter 208 may receive a subbeam of the incoming signal beam from an associated antenna element 202. Phase shifters 208 apply a phase shift to the received subbeam of the incoming signal beam from antenna elements 202. For example, phase shifters 208 may apply a relative phase shift to each subbeam such that each phase compensated signal is aligned to be in phase when combined by combiner 210. Phase shifters 208 send the phase compensated signal to combiner 210 to be combined together. In some embodiments, each DBF device 206 includes one combiner 210 coupled to all the phase shifters 208 of the specific DBF device 206. In other embodiments, each DBF device 206 may comprise multiple combiners 210 configured to receive phase shifted signals from a portion of the phase shifters 208 of a DBF device 206.

In some embodiments, as illustrated in FIG. 2A, communication system 200 may include a DBF device 206 that includes phase shifters 208, combiner 210, and a TTD circuit 214. The TTD circuit 214 can be a processing element, such as a discrete component, logic circuitry, a digital functional block, a programmable block, such as a DSP block, or the like. Each TTD circuit 214 may apply a true time delay that is coordinated with a TTD circuit 214 of an adjacent DBF device 206. In a TTD enabled mode, the TTD circuit 214 applies a true time delay (TTD) to a combined signal from the combiner 210.

In some embodiments, after the TTD circuit 214 applies a TTD, the signal is aggregated with other time delayed signals from other DBF devices 206. For example, a first DBF device may send the combined signal processed by the first DBF device to a second DBF device that can aggregate the combined signal of the first DBF device with a combined signal of the second DBF device. The second DBF device may further send the aggregated signal of the first and second DBF devices to a third DBF device that can aggregate the signal with a third combined signal of the third DBF device. This process may continue until the combined signals from each DBF device are fully aggregated. In other embodiments, communication system 200 may include a DBF signal combiner that receives and combines each combined signal from each of the DBF devices 206. In some embodiments, a TTD circuit of a first DBF device and a TTD circuit of a second DBF device align a relative time delay between a signal of the first DBF and a signal of the second DBF.

In some embodiments, a single TTD circuit 214 may be implemented for each DBF device 206. Each DBF device 206 may support N antenna elements 202. Phase shifters 208 may be incorporated for all antenna elements 202, including independent phase control for each beam. When the TTD mode is enabled for a particular beam, the relative time delay between M DBF devices 206 may be aligned using TTD circuits 214. The relative time delay between each antenna element 202 within its respective DBF device 206 may be aligned using phase shifters 208. In this mode, phase shifters may perform fine intra DBF device 206 adjustments, and TTD circuits 214 may perform coarse inter DBF delay adjustments. After combining phase compensated signals from N antenna elements 202, TTD circuits 214 may be applied to the summed signal to compensate for relative time delays between adjacent DBF devices 206. The beamformed signal in the TTD mode may be given by the following equation (1):

$$y_{BF} = \sum_{m=0}^{M-1}\sum_{n=0}^{N-1} y_{mn}(t-\tau_m)e^{-j\varphi_n} \quad (1)$$

where $\tau_m$ represents the true-time delay value of the $m^{th}$ DBF device 206 and $\varphi_n$ represents the phase shift value of the $n^{th}$ antenna element within the $m^{th}$ DBF device 206. In some embodiments, the delay values may be proportional to the beam scan angle.

In some embodiments, as illustrated in FIG. 2B, communication system 200 may operate in a non-TTD-enabled mode (also referred to as a TTD bypass mode) where the TTD circuits 214 are disabled and/or bypassed. In this mode, phase shifters 208 may be exclusively used to compensate for relative phase shifts for all antenna elements 202 in the antenna array. The beam formed signal in this mode may be given by the following equation (2):

$$y_{BF} = \sum_{m=0}^{M-1}\sum_{n=0}^{N-1} y_{mn}(t)e^{-j\varphi_n} \quad (2)$$

where $\varphi_n$ represents the phase shift value of the $n^{th}$ antenna element within the $m^{th}$ DBF device 206.

In some embodiments, the communication system 200 may selectively switch between the TTD mode and the TTD bypass mode. For example, delay circuitry (e.g. delay circuitry 112 of FIG. 1) may be used to selectively switch between a TTD circuit (e.g. TTD circuit 114 of FIG. 1) and a bypass circuit (e.g. bypass circuit 116 of FIG. 1). In some embodiments, the communication system 200 may enable the TTD bypass mode when a scan angle of the incoming signal beam is below a threshold angle. The communication system 200 may enable the TTD mode when a scan angle of the incoming signal beam is above a threshold angle. The threshold angle may be predetermined or may be dynamically determined based on an indication of the incoming signal beam (e.g. such as the quality, magnitude, frequency band, and/or wavefront scan angle of the incoming signal beam).

In some embodiments, as illustrated in FIG. 2C, each DBF device 206 may include multiple TTD circuits 214. Each TTD circuit 214 applies a time delay to a combined signal from combiners 210. Each TTD circuit 214 may apply a different time delay in coordination with other TTD circuits 214. The resulting time delayed signal of the same DBF device 206 may be aggregated and further combined with other delayed signals of other DBF devices 206.

Figure 3A:
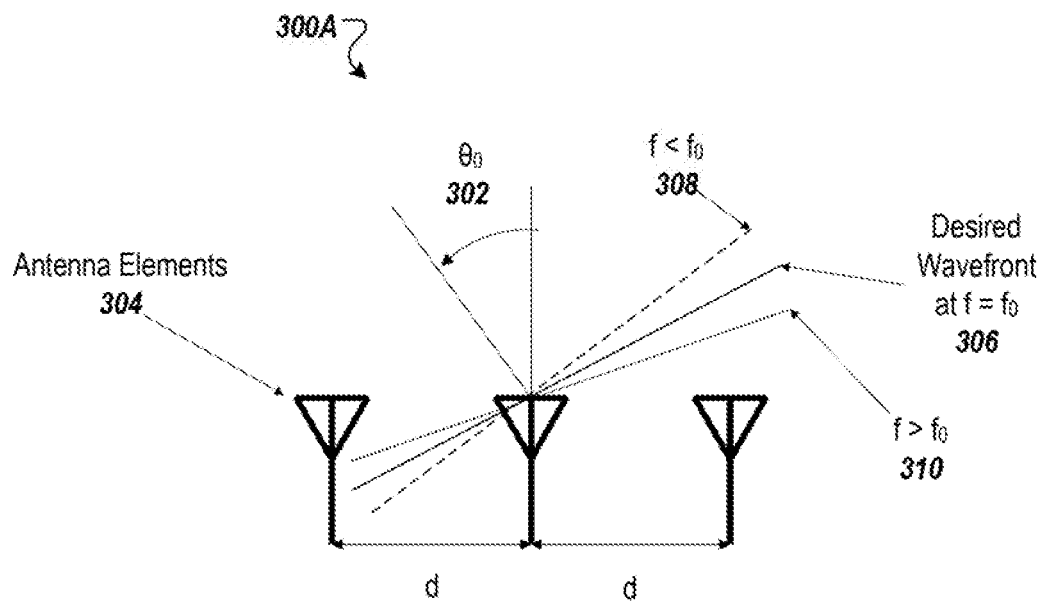
FIG. 3A illustrates changes in wave propagation direction due to beam squint from using phase shifters without enabling a TTD circuit, according to embodiments of the present disclosure.

FIG. 3A illustrates changes in wave propagation direction 300A due to beam squint from using phase shifters without enabling a TTD circuit, according to embodiments of the present disclosure. The direction of a desired wavefront 306 may be controlled by changing the relative delay or phase shift of a signal between each antenna element 304. In some embodiments, when a beam arrives or departs at a given scan angle $\theta_0$ 302, each antenna elements is excited with a relative delay, $\tau$, as expressed in equation (3):

$$\tau = \frac{d \sin\theta_0}{c} \qquad (3)$$

where d is the spacing between antenna elements 304 and c is the speed of light. The signal at the $n^{th}$ antenna (e.g. one of antenna elements 304, n antennas away from center) at the carrier frequency $f_0$ may be given by the following equation (4):

$$y_n(t) = x(t+n\tau)e^{j2\pi f_0(t+n\tau)} \qquad (4)$$

In some embodiments, time delay may result in a phase offset as well as a delay in the signal. In some embodiments using narrowband signals, the following approximation can be made as expressed in the following equation (5):

$$x(t+n\tau) \approx x(t), \text{ for } n\tau \ll \frac{1}{BW} \qquad (5)$$

where BW is the signal bandwidth. However, in embodiments using wideband signals, the approximation may not hold. For example, if phase shifts are used as approximation for the delays, the direction of the beam may become a function of the operating frequency and is scanned to a desired angle only at a center frequency $f_0$. This dependency, otherwise known as beam squint, may limit the bandwidth in phased array systems for large scan angles. Beam squint causes beam scan angle 302 to decrease for angles below the central frequency, (e.g. lower frequencies 308). At angles above the central frequency (e.g. upper frequencies 310), beam squint causes the beam scan angle 302 to increase. This angular increase or decrease may also result in a gain reduction of the signal in the desired beam direction. The amount of deviation may depend on the size of the antenna array formed by antenna elements 304, scan angle 302, and fractional bandwidth of the signal. The fractional signal bandwidth at which the gain is reduced to half power may be given by the following equation (6):

$$\frac{\Delta f}{f} = \beta \left( \frac{c}{L \times \sin\theta_0 \times f_0} \right) \qquad (6)$$

where $\beta$ is a beam broadening factor and L is the aperture size of the array (e.g. sum of all distances, d, between array elements 304). In some embodiments, usable fractional signal bandwidth is lost with increasing aperture size L and increasing beam scan angle $\theta_0$ 302.

Figure 3B:
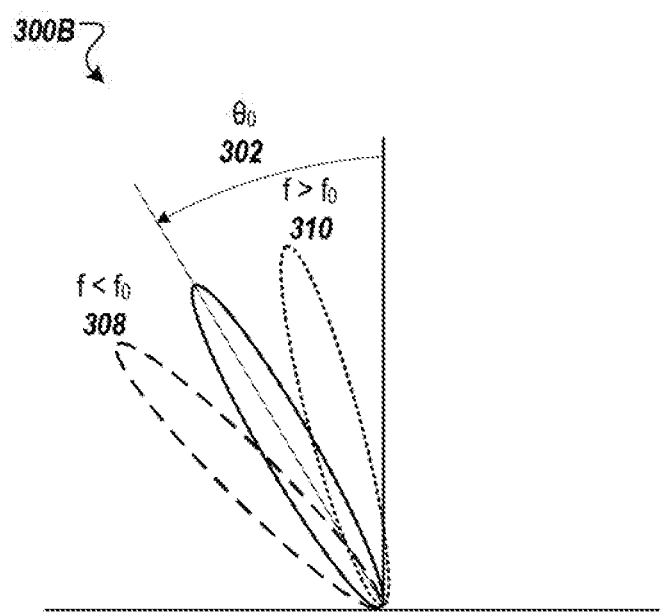
FIG. 3B illustrates a beam pointing error resulting from beam squint at a desired scan angle from using phase shifters without enabling a TTD circuit, according to embodiments of the present disclosure.

FIG. 3B illustrates a beam pointing error 300B resulting from beam squint at a desired scan angle 302 from using phase shifters without enabling a TTD circuit, according to embodiments of the present disclosure. Beam squint may impact the beam such that the direction of the beam becomes a function of the operating frequency and is scanned to a desired angle only at a central frequency $f_0$. Frequencies above (e.g. upper frequencies 310) and below (e.g. lower frequencies 308) may be shifted away from the central frequency resulting in beam dispersion. This dispersive effect may result in a signal gain reduction. For example, a channel of a communication system (e.g. communication system 100-200 of FIGS. 1-2) may include upper frequencies 310 having frequencies up to 50 GHz, and lower frequencies 308 having frequencies as low as 0 Hz operating at scanning angle 302 (e.g. 35 Degrees). After applying a phase shift to the signal, frequencies in the middle of the frequency range of the channel (e.g. 25 Hz) can have a wavefront angle at or near the scan angle 302 (e.g. 35 Degrees). Frequencies above the central frequency (e.g. upper frequencies 310 above 25 Hz) may have wavefront angles that are skewed or tilted such that the wavefront angles are smaller than the scan angle (e.g. less than 35 Degrees). Frequencies below the central frequency (e.g. lower frequencies 308 below 25 Hz) may have wavefront angles that are skewed or tilted such that the wavefront angles are larger than the scan angle 302 (e.g. greater than 35 Degrees).

In some embodiments, the greater the frequency range the greater the impact of the beam pointing error from the beam squint. The use of TTD circuits in addition to phase shifters mitigates the error due to beam squint by decreasing the displacement of the upper frequencies 310 and the lower frequencies 308 from the desired beam direction determined by the scan angle 302. Using TTD circuits may result in the ability to use larger signal bandwidths while minimizing the signal gain reduction of the system.

Figure 4:
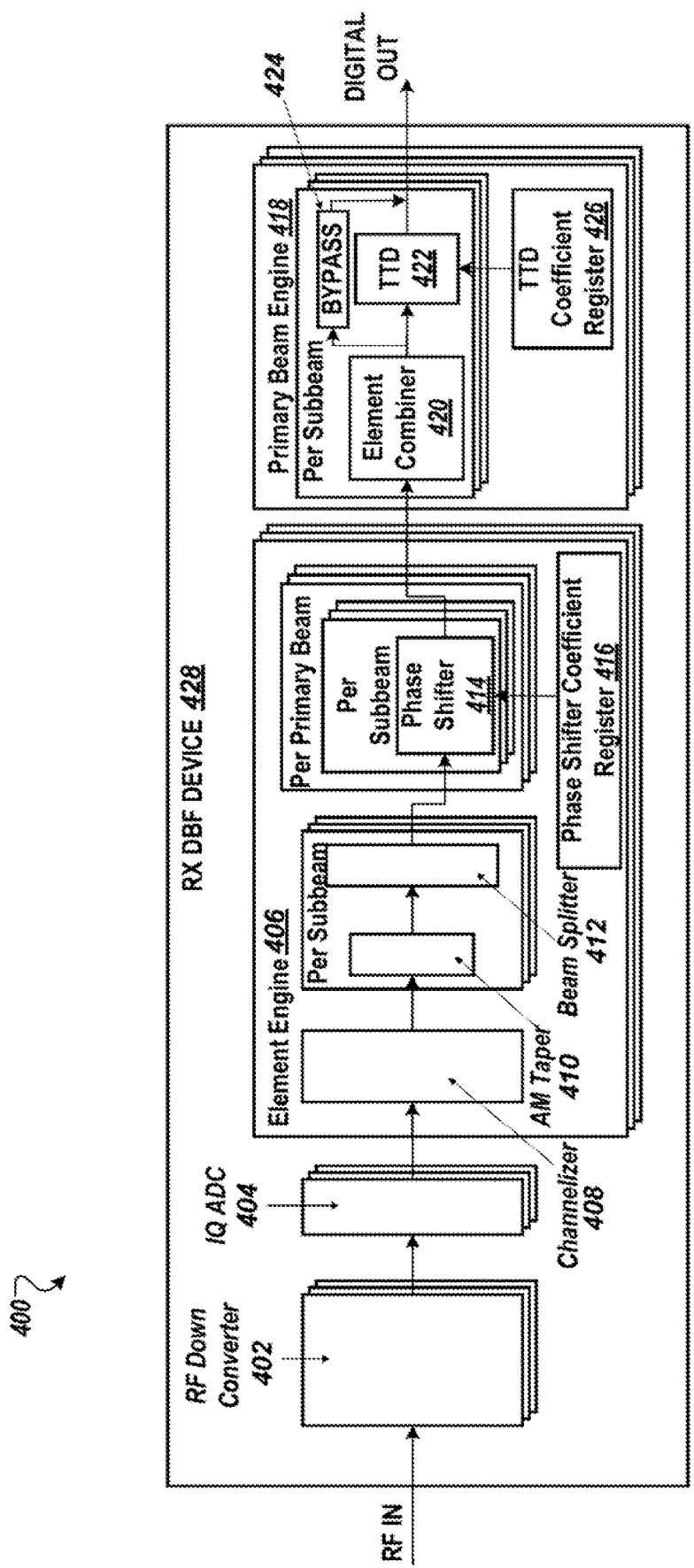
FIG. 4 is block diagram of a receiving circuit with a DBF device including phase shifters and TTD circuits, according to embodiments of the present disclosure.

FIG. 4 is block diagram of a receiving circuit 400 with a DBF device 428 including phase shifters 414 and TTD circuits 422, according to embodiments of the present disclosure. The DBF device 428 includes an RF down converter 402. The RF down converter 402 receives an input RF signal and converts the signal in preparation for sampling. An in-phase and quadrature (IQ) analog to digital converter (ADC) 404 is coupled to the RF down converter 402 to sample and convert the down converted signal into a digital signal. In some embodiments, the ADC generates samples that are not necessarily IQ samples. For example, the ADC may generate samples using quadrature phase shift keying (QPSK). The RF down converter 402 and IQ ADC 404 can be processing elements of the DBF device 428, such as a discrete component, a discrete circuit, logic circuitry, a digital functional block, a programmable block, such as a DSP functional block, or the like.

As shown in FIG. 4, the receiving circuit 400 includes an element engine 406. The element engine includes a channelizer 408 coupled to the ADC 404. The channelizer 408 performs a channelizing function. In some embodiments, the input signal received by receiving circuitry 400 is a broadband signal comprising multiple subbeams of various frequencies and signal modulations. For example, the channelizer 408 can divide a broadband signal beam into subbeams and organize the subbeams into channels based on the frequency of each subbeams. In another example, the channelizer 408 can divide a signal into multiple channels based on signal modulations. Signal modulations can include indicators of sources of the received signal by the channelizer. For, example a subbeam of the input signal beam may include a signal modulation that identifying a remote device as the source of the transmitted subbeam. Alternatively, the channelizer can divide the incoming signal into various channels based on predetermined criteria of the incoming signal beam.

An amplitude (AM) taper 410 is coupled to the channelizer 408 and applies an amplitude shaping function to the signal in each channel. In some embodiments, the AM taper 410 applies a weighting function to adjust the amplitude of the signal of each signal. For example, the AM taper 410 may apply an amplitude shaping function to reduce the side lobe levels of the signal of each channel and increase the main lobe beamwidth of the signal of each channel. In another example, the AM taper 410 may provide an amplitude shaping function to improve the directivity of the signal from the antenna array.

A beam splitter 412 is coupled to the AM taper 410 to split the signal of each channel into primary beams and subbeams within each primary beam. In some embodiments, each primary beam and corresponding subbeams may be associated with a different input source (e.g. user device, remote server, wireless communication device, etc.) of the input signal received by the receiving circuit 400. The channelizer 408, AM taper 410, and beam splitter 412 can be processing elements of the element engine 406, such as a discrete component, a discrete circuit, logic circuitry, a digital functional block, a programmable block, such as a DSP functional block, or the like.

As shown in FIG. 4, the element engine 406 can further include a phase shifter 414 for each subbeam of each of the primary beams, where each phase shifter 414 is coupled to the beam splitter 412. Each phase shifter 414 is coupled to the phase shifter coefficient register 416. The phase shifter coefficient register 416 includes data (e.g. register values) associated with the amount of time delay (i.e., time duration) an associated phase shifter 414 applies to a subbeam. In some embodiments, the phase shifter coefficient register 416 receives data from a processing device that coordinates the relative phase shift of each phase shifter 414 across each primary beam and associated subbeams. For example, the phase shifter coefficient register 416 may store mapped data corresponding to a specific phase shift to be applied by an associated phase shifter 414 that results in each phase compensated signal being in phase with each other. The phase shifters 414 and phase shifter coefficient register 416 can be a processing element of the element engine 406, such as a discrete component, a discrete circuit, logic circuitry, a digital functional block, a programmable block, such as a DSP functional block, or the like.

As shown in FIG. 4, the receiving circuit 400 may include a primary beam engine 418. The primary beam engine includes an element combiner 420, a TTD circuit 422, a bypass circuit 424, and a TTD coefficient register 426. The element combiner 420 is coupled to the element engine 406 and receives the phase compensated signals from the phase shifters 414. The element combiner 420 combines the phase compensated signals of each subbeam to generate an aggregated signal. The TTD circuit 422 and bypass circuit 424 are coupled to the element combiner such that the TTD circuit 422 and the bypass circuit 424 are selectively enabled to process the aggregated signal from the element combiner 420. The TTD coefficient register 426 is coupled to the bypass circuit 424 and the TTD circuit 422. The TTD coefficient register 426 includes data (e.g. register values) that are indicative of a mode of operation of the primary beam engine. The TTD coefficient register 426 may include data associated with a true time delay to be applied by the TTD circuit that is specific to the DBF device. The element combiner 420, the bypass circuit 424, the TTD circuit 422, and TTD coefficient register can be processing elements of the primary beam engine 418, such as a discrete component, a discrete circuit, logic circuitry, a digital functional block, a programmable block, such as a DSP functional block, or the like.

In a first mode of operation (e.g. TTD mode) of the DBF device 428, the aggregated signal from the element combiner 420 is processed by the TTD circuit 422. The TTD circuit 422 applies a true time delay associated with the data of the TTD coefficient register 426. In a second mode (e.g. TTD bypass mode) of the DBF device 428, the aggregated signal from the element combiner 420 is processed by the bypass circuit 424. The bypass circuit 424 does not apply a time delay. In each mode, the signal can be outputted for further processing.

Figure 5A:
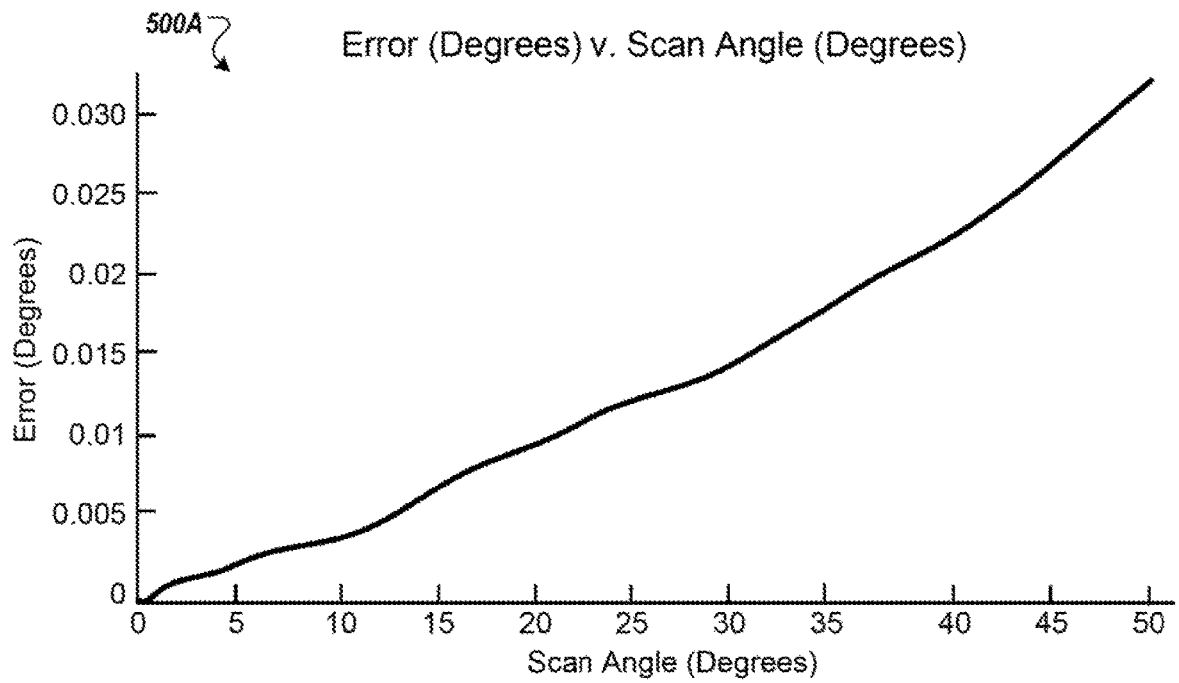
FIG. 5A is a graph depicting relative beam squint error of scan angles using a non-TTD-enabled mode, according to embodiments of the present disclosure.
Figure 5B:
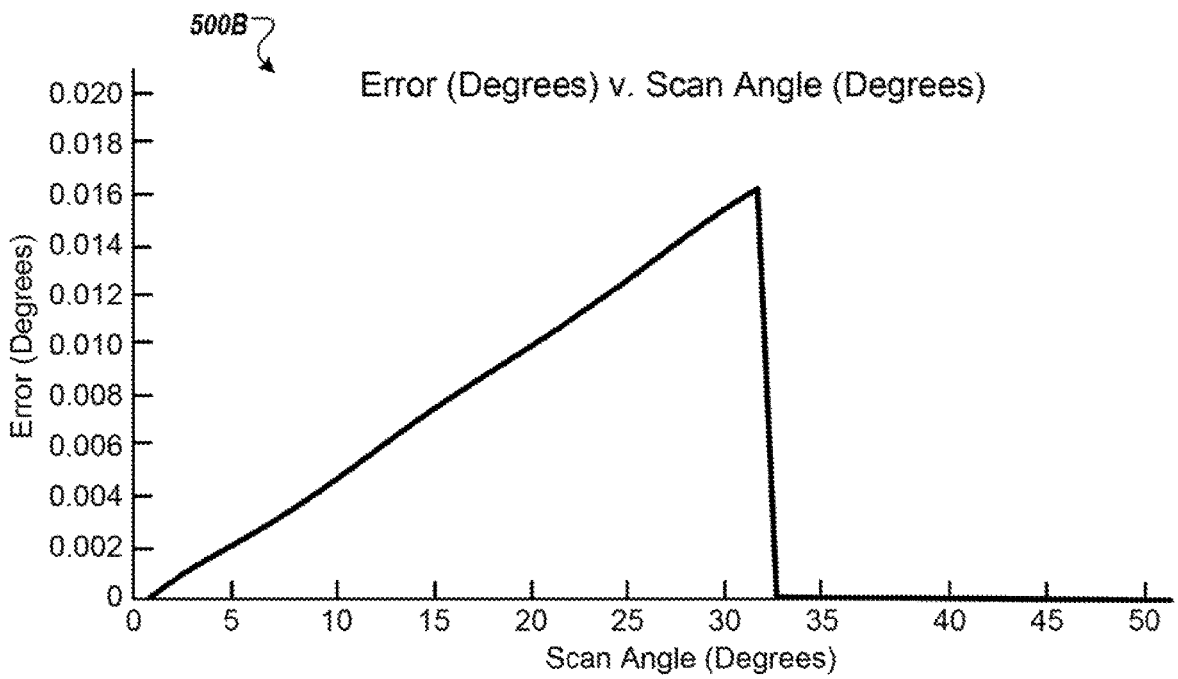
FIG. 5B is a graph depicting relative beam squint error of scan angles using a TTD-enabled mode of a communication system above a threshold angle, according to embodiments of the present disclosure.

FIG. 5A is a graph 500A depicting relative beam squint error of scan angles using a non-TTD-enabled mode of a communication system, according to embodiments of the present disclosure. FIG. 5B is a graph 500B depicting relative beam squint error of scan angles using a TTD-enabled mode of a communication system for scan angles above a threshold scan angle, according to embodiments of the present disclosure. The communication system can be any of the communication systems described herein, for example, communication system 100 of FIG. 1, communication system 200 in FIGS. 2A-2C, communication system 600 in FIG. 6, or a communication system using receiving circuit 400 of FIG. 400. Graph 500A shows that in one embodiment using a non-TTD-enabled mode (e.g. selecting a data path through bypass circuit 116 of FIG. 1 or bypass circuit 424 of FIG. 4) the relative beam squint error increases with the scan angle. Graph 500B shows that in one embodiment switching from a non-TTD-enabled mode to a TTD-enabled mode (e.g. selecting a data path through TTD circuit 114 of FIG. 1 or TTD circuit 422 of FIG. 4) results in reduced beam squint error. Specifically, FIG. 5A shows beam squint error of an embodiment with scan angles swept from 0 Degrees to 50 Degrees for a non-TTD-enabled mode where the carrier frequency is 28.5 GHz and the signal bandwidth is 25 MHz. FIG. 5B depicts beam squint error of an embodiment with scan angles swept from 0 Degrees to 50 Degrees for a TTD-enabled mode for angles above 30 Degrees where the carrier frequency is 28.5 GHz and the signal bandwidth is 25 MHz.

Figure 6:
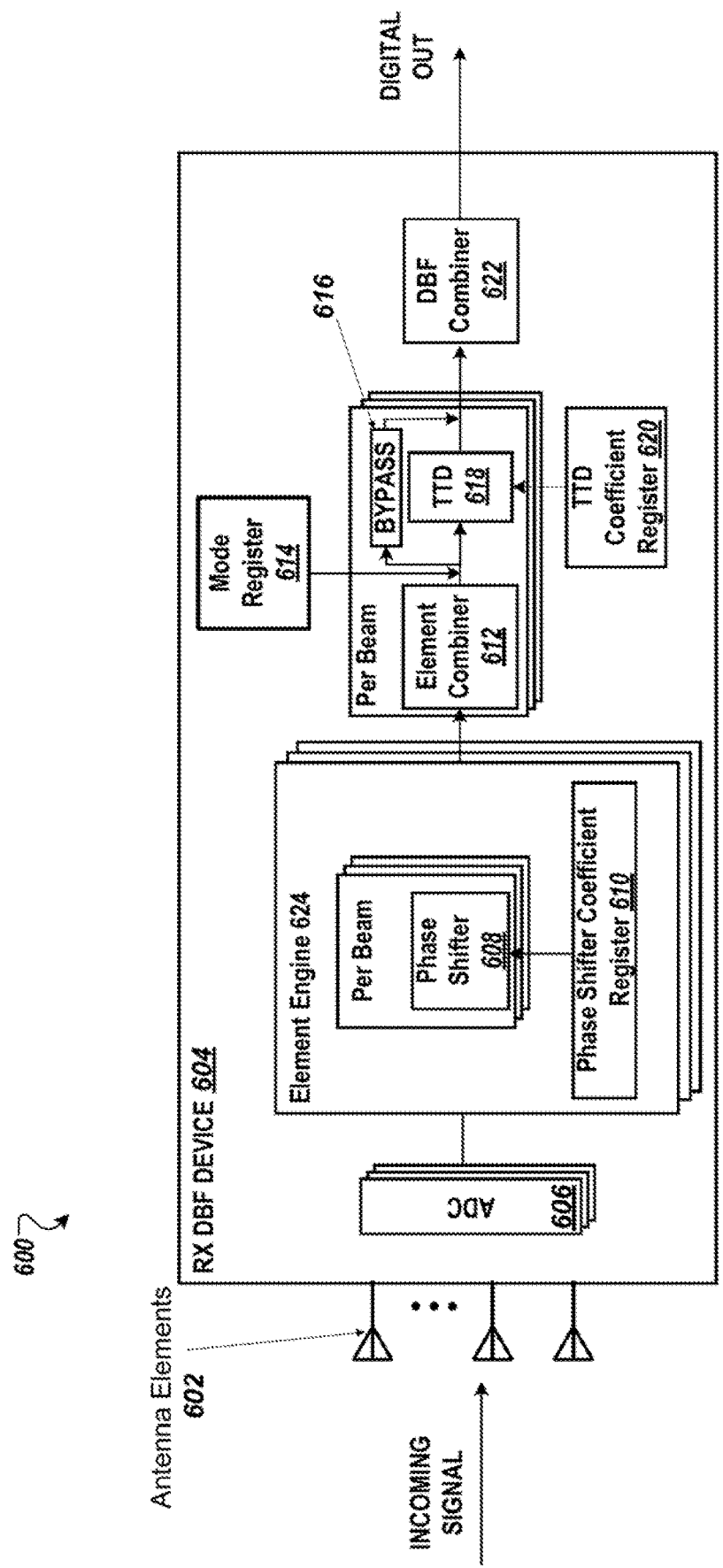
FIG. 6 is block diagram of a communication system including antenna elements and a DBF device with phase shifters and a selective true-time delay (TTD) circuit, according to embodiments of the present disclosure

FIG. 6 is a block diagram of a communication system 600 including antenna elements 602 and a DBF device 604 with phase shifters 608 and a selective TTD circuit 618, according to embodiments of the present disclosure. The communication system 600 includes antenna elements 602 (e.g. antenna elements that form an antenna array) coupled to the DBF device 604. Antenna elements 602 each receive portions of a signal beam and transmit the received signal to the DBF device 604. The DBF device includes analog to digital converters (ADC) 606. In some embodiments, an ADC 606 may be coupled to a portion of the antenna elements 602. For example, the DBF device 604 may include a plurality of ADCs each coupled to a portion of the antenna elements 602 to convert different subbeams of an incoming signal. In another example, the DBF device 604 may include one ADC 606 for the entire DBF device 604. The ADC 606 can be a processing element of the DBF device 604, such as a discrete component, a discrete circuit, logic circuitry, a digital functional block, a programmable block, such as a DSP functional block, or the like. The ADC 606 can generate sample for various subbeams of the signal beam received by antenna elements 602.

As shown in FIG. 6, the DBF device 604 may further include an element engine 624 that includes phase shifters 608 coupled to the ADC 606 and a phase shifter coefficient register 610 coupled to the phase shifters. The phase shifter coefficient register 610 stores data (e.g. register values) associated with phase shift quantities for each phase shifter 608. The phase shifters 608 receive the converted digital subbeams from the ADC 606 and apply a phase shift. Each phase shifter 608 applies a phase shift to a received digital subbeam corresponding to the data stored in an associated phase shifter coefficient register 610. In some embodiments, the values stored in the phase shifter coefficient register 610 are associated with the spatial location of the antenna elements that received the subbeams that the phase shifters are processing. For example, a phase shifter 608 may apply a larger phase shift to a digital signal that is received by an antenna element 602 located near the boundary of an antenna array formed by the antenna elements 602 than a digital signal that is receive by an antenna element located near the center of the antenna array. In some embodiments, the phase shifter coefficient register 610 maps phase shift values to the phase shifters 608 such that the resulting phase compensated digital signals are in phase with each other. The phase shifters 608 and phase shifter coefficient registers 610 can be processing elements of the DBF device 604, such as a discrete component, a discrete circuit, logic circuitry, a digital functional block, a programmable block, such as a DSP functional block, or the like.

As shown in FIG. 6, the DBF device 604 further includes an element combiner 612 coupled to the phase shifters 608. The element combiner 612 receives the phase compensated signals from the phase shifter 608 and combines the signals together. In some embodiments, the DBF device 604 includes multiple element combiners 612 to add portions of the phase compensated signals together. For example, each element combiner 612 may aggregate signals associated with antenna elements 602 located in close proximity on the antenna array.

As shown in FIG. 6, The DBF device 604 further includes a mode register 614, a bypass circuit 616, a TTD circuit 618, and a TTD coefficient register 620. The Mode register 614 is coupled to the element combiners 612 and includes data (e.g. register values) indicative of a mode of operation of the DBF device 604. The bypass circuit 616 and the TTD circuit 618 are coupled to the mode register 614. The mode register 614 includes data indicative of whether the bypass circuit 616 or the TTD circuit 618 is used. The bypass circuit 616 and the TTD circuit 618 may be designed to be selectively enabled based on the data stored in mode register 614. The TTD coefficient register 620 stores time delay values that are associated with time delays applied by the TTD circuit 618. The TTD circuit 618 applies a true time delay corresponding to the data stored in the TTD coefficient register 620. In some embodiments, the values stored in the TTD coefficient register 620 are associated with the spatial location of the antenna elements that received the signals that the TTD circuit is processing. For example, the TTD circuit 618 may apply a larger true time delay if the DBF device 604 is coupled with antenna elements 602 located near the boundary of an antenna array than with antenna elements 602 located near the center of an antenna array. The element combiner 612, mode register 614, bypass circuit 616, TTD circuit 618, and TTD coefficient register can be processing elements of the DBF device 604, such as a discrete component, a discrete circuit, logic circuitry, a digital functional block, a programmable block, such as a DSP functional block, or the like.

In some embodiments, the mode register 614 can store data indicative of using the TTD circuit 618 or the bypass circuit 616 based on the angle of the signal received by the antenna elements 602. For example, if the scan angle of the incoming signal is below a threshold angle then the mode register can store data indicative of using the bypass circuit 616. In another example, if the scan angle of the incoming signal is above a threshold angle then the mode register can store data indicative of using the TTD circuit 618. In some embodiments, mode register 614 can store data indicative of using the TTD circuit 618 or the bypass circuit 616 based on the signal strength of the combined signal from the element combiner 612. For example, if the combined signal has a magnitude above a threshold magnitude the mode register can store data indicative of using the bypass circuit 616. In another example, if the combined signal has a magnitude below a threshold magnitude, then the mode register 614 may store data indicative of using the TTD circuit 618. Alternatively, other mechanisms than a threshold value can be used to selectively enable the bypass circuit 616 or the TTD circuit 618.

In some embodiments, a first register (e.g. mode register 614) may store a value indicative of the mode of operation (e.g. a first value indicates a first mode and a second value indicates a second mode). The first mode may be enabled for beam scan angles that are equal or less than a threshold value. The threshold value may be set for enabling time delay adjustments for dynamic beam squint mitigation. The second mode may be enabled for beam scan angles that are greater than the threshold value. A second register (e.g. TTD coefficient register 620) may store a first TTD coefficient value indicative of a time delay to be applied by a TTD circuit 618 when in the first mode of operation.

In a further embodiment, a second DBF device may be used that includes a third register (e.g. another mode register 614) that stores either the first or second value indicative of a mode of operation of the second DBF device. The second DBF device may also include a fourth register (e.g. another TTD coefficient register 620) that stores a second TTD coefficient value. The first TTD coefficient value and the second TTD coefficient value may be coordinated such that when the TTD circuit of the first DBF device applies a time delay associated with the first TTD coefficient value and the TTD circuit of the second DBF device applies a time delay associated with the second TTD coefficient value the time delay compensated signals from both DBF devices are aligned. In a further embodiment, a third DBF device may include a third TTD coefficient value that when applied by the TTD delay circuit of the third DBF device, the resulting time delay compensated signal of the third DBF device is aligned with the aggregated signal of the first DBF device and the second DBF device.

As shown in FIG. 6, The DBF device 604 further includes a DBF combiner 622 coupled to the TTD circuit 618 and the bypass circuit 616. The DBF combiner 622 combines the time delay compensated signals after being processed by either the TTD circuit 618 or the bypass circuit 616. The DBF device then outputs the signal that may be processed further. In some embodiments the DBF combiner 622 may receive processed signals from other DBF devices to combine with a signal from the current DBF device. The DBF combiner may send the combined signal to another DBF device for further processing. The DBF combiner 622 can be a processing element of the DBF device 604, such as a discrete component, a discrete circuit, logic circuitry, a digital functional block, a programmable block, such as a DSP functional block, or the like.

Figure 7:
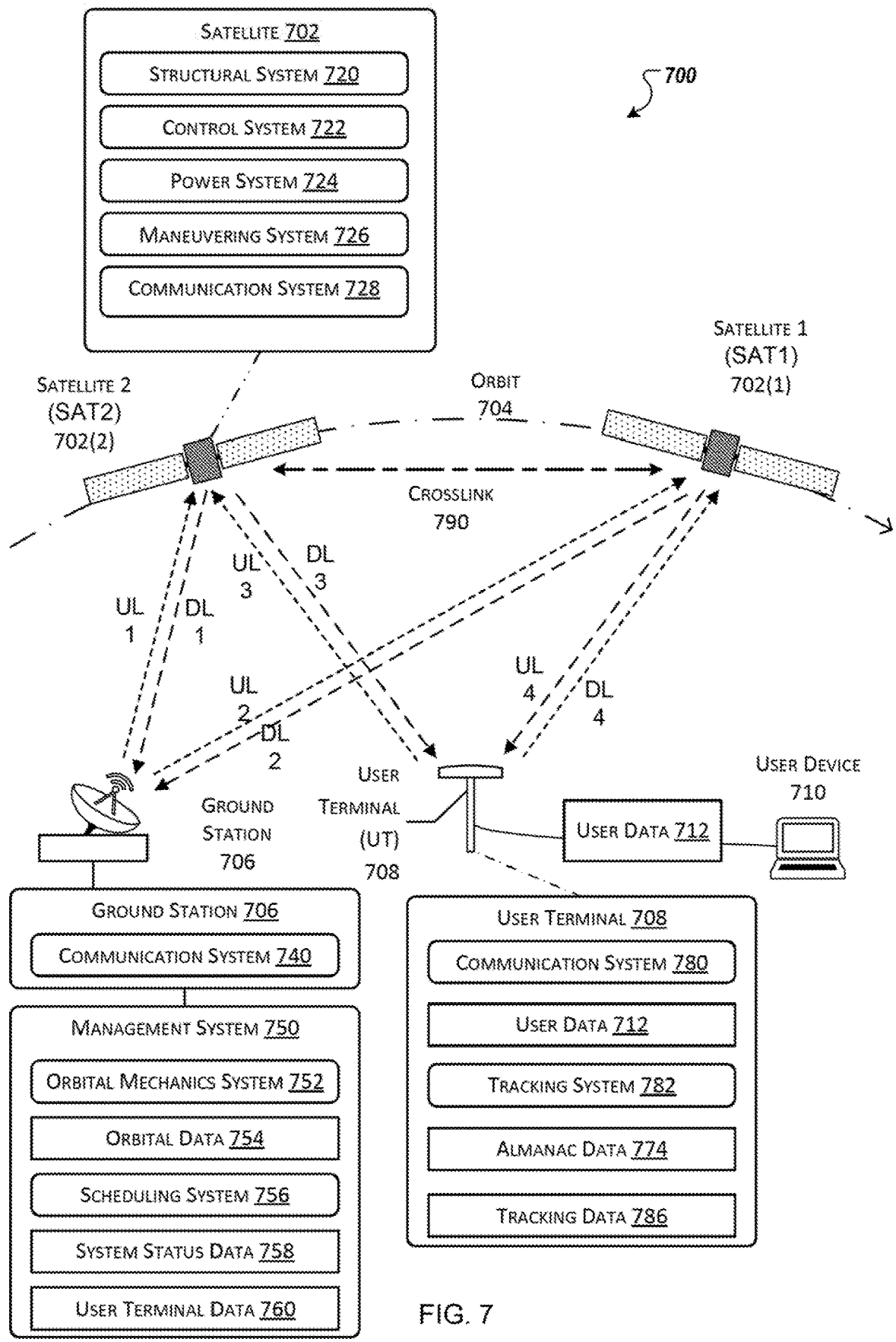
FIG. 7 illustrates a system including a constellation of satellites, each satellite being in orbit, according to embodiments of the present disclosure.

FIG. 7 illustrates a system 700 including a constellation of satellites 702(1), 702(2), . . . , 702(S), each satellite 702 being in orbit 704 according to embodiments of the present disclosure. The system 700 shown here comprises a plurality (or "constellation") of satellites 702(1), 702(2), . . . , 702(S), each satellite 702 being in orbit 704. Any of the satellites 702 can include the communication system 100, 200, and 600 of FIGS. 1, 2, and 6 as well as receiving circuit 400 of FIG. 4. Also shown is a ground station 706, user terminal (UT) 708, and a user device 710.

The constellation may comprise hundreds or thousands of satellites 702, in various orbits 704. For example, one or more of these satellites 702 may be in non-geosynchronous orbits (NGOs) in which they are in constant motion with respect to the Earth. For example, the orbit 704 is a low earth orbit (LEO). In this illustration, orbit 704 is depicted with an arc pointed to the right. A first satellite (SAT1) 702(1) is leading (ahead of) a second satellite (SAT2) 702(2) in the orbit 704.

The satellite 702 may comprise a structural system 720, a control system 722, a power system 724, a maneuvering system 726, and a communication system 728 described herein. In other implementations, some systems may be omitted or other systems added. One or more of these systems may be communicatively coupled with one another in various combinations.

The structural system 720 comprises one or more structural elements to support operation of the satellite 702. For example, the structural system 720 may include trusses, struts, panels, and so forth. The components of other systems may be affixed to, or housed by, the structural system 720. For example, the structural system 720 may provide mechanical mounting and support for solar panels in the power system 724. The structural system 720 may also provide for thermal control to maintain components of the satellite 702 within operational temperature ranges. For example, the structural system 720 may include louvers, heat sinks, radiators, and so forth.

The control system 722 provides various services, such as operating the onboard systems, resource management, providing telemetry, processing commands, and so forth. For example, the control system 722 may direct operation of the communication system 728.

The power system 724 provides electrical power for operation of the components onboard the satellite 702. The power system 724 may include components to generate electrical energy. For example, the power system 724 may comprise one or more photovoltaic cells, thermoelectric devices, fuel cells, and so forth. The power system 724 may include components to store electrical energy. For example, the power system 724 may comprise one or more batteries, fuel cells, and so forth.

The maneuvering system 726 maintains the satellite 702 in one or more of a specified orientation or orbit 704. For example, the maneuvering system 726 may stabilize the satellite 702 with respect to one or more axis. In another example, the maneuvering system 726 may move the satellite 702 to a specified orbit 704. The maneuvering system 726 may include one or more computing devices, sensors, thrusters, momentum wheels, solar sails, drag devices, and so forth. For example, the sensors of the maneuvering system 726 may include one or more global navigation satellite system (GNSS) receivers, such as global positioning system (GPS) receivers, to provide information about the position and orientation of the satellite 702 relative to Earth. In another example, the sensors of the maneuvering system 726 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 728 provides communication with one or more other devices, such as other satellites 702, ground stations 706, user terminals 708, and so forth. The communication system 728 may include one or more modems, digital signal processors, power amplifiers, antennas (including at least one antenna that implements multiple antenna elements, such as a phased array antenna, and including an embedded calibration antenna, such as the calibration antenna 704 as described herein), processors, memories, storage devices, communications peripherals, interface buses, and so forth. Such components support communications with other satellites 702, ground stations 706, user terminals 708, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 728 may be output to other systems, such as to the control system 722, for further processing. Output from a system, such as the control system 722, may be provided to the communication system 728 for transmission.

One or more ground stations 706 are in communication with one or more satellites 702. The ground stations 706 may pass data between the satellites 702, a management system 750, networks such as the Internet, and so forth. The ground stations 706 may be emplaced on land, on vehicles, at sea, and so forth. Each ground station 706 may comprise a communication system 740. Each ground station 706 may use the communication system 740 to establish communication with one or more satellites 702, other ground stations 706, and so forth. The ground station 706 may also be connected to one or more communication networks. For example, the ground station 706 may connect to a terrestrial fiber optic communication network. The ground station 706 may act as a network gateway, passing user data 712 or other data between the one or more communication networks and the satellites 702. Such data may be processed by the ground station 706 and communicated via the communication system 740. The communication system 740 of a ground station may include components similar to those of the communication system 728 of a satellite 702 and may perform similar communication functionalities. For example, the communication system 740 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 706 are in communication with a management system 750. The management system 750 is also in communication, via the ground stations 706, with the satellites 702 and the UTs 708. The management system 750 coordinates operation of the satellites 702, ground stations 706, UTs 708, and other resources of the system 700. The management system 750 may comprise one or more of an orbital mechanics system 752 or a scheduling system 756. In some embodiments, the scheduling system 756 can operate in conjunction with an HD controller.

The orbital mechanics system 752 determines orbital data 754 that is indicative of a state of a particular satellite 702 at a specified time. In one implementation, the orbital mechanics system 752 may use orbital elements that represent characteristics of the orbit 704 of the satellites 702 in the constellation to determine the orbital data 754 that predicts location, velocity, and so forth of particular satellites 702 at particular times or time intervals. For example, the orbital mechanics system 752 may use data obtained from actual observations from tracking stations, data from the satellites 702, scheduled maneuvers, and so forth to determine the orbital elements. The orbital mechanics system 752 may also consider other data, such as space weather, collision mitigation, orbital elements of known debris, and so forth.

The scheduling system 756 schedules resources to provide communication to the UTs 708. For example, the scheduling system 756 may determine handover data that indicates when communication is to be transferred from the first satellite 702(1) to the second satellite 702(2). Continuing the example, the scheduling system 756 may also specify communication parameters such as frequency, timeslot, and so forth. During operation, the scheduling system 756 may use information such as the orbital data 754, system status data 758, user terminal data 760, and so forth.

The system status data 758 may comprise information such as which UTs 708 are currently transferring data, satellite availability, current satellites 702 in use by respective UTs 708, capacity available at particular ground stations 706, and so forth. For example, the satellite availability may comprise information indicative of satellites 702 that are available to provide communication service or those satellites 702 that are unavailable for communication service. Continuing the example, a satellite 702 may be unavailable due to malfunction, previous tasking, maneuvering, and so forth. The system status data 758 may be indicative of past status, predictions of future status, and so forth. For example, the system status data 758 may include information such as projected data traffic for a specified interval of time based on previous transfers of user data 712. In another example, the system status data 758 may be indicative of future status, such as a satellite 702 being unavailable to provide communication service due to scheduled maneuvering, scheduled maintenance, scheduled decommissioning, and so forth.

The user terminal data 760 may comprise information such a location of a particular UT 708. The user terminal data 760 may also include other information such as a priority assigned to user data 712 associated with that UT 708, information about the communication capabilities of that particular UT 708, and so forth. For example, a particular UT 708 in use by a business may be assigned a higher priority relative to a UT 708 operated in a residential setting. Over time, different versions of UTs 708 may be deployed, having different communication capabilities such as being able to operate at particular frequencies, supporting different signal encoding schemes, having different antenna configurations, and so forth.

The UT 708 includes a communication system 780 to establish communication with one or more satellites 702. The communication system 780 of the UT 708 may include components similar to those of the communication system 728 of a satellite 702 and may perform similar communication functionalities. For example, the communication system 780 may include one or more modems, digital signal processors, power amplifiers, antennas (including at least one antenna that implements multiple antenna elements, such as a phased array antenna), processors, memories, storage devices, communications peripherals, interface buses, and so forth. The UT 708 passes user data 712 between the constellation of satellites 702 and the user device 710. The user data 712 includes data originated by the user device 710 or addressed to the user device 710. The UT 708 may be fixed or in motion. For example, the UT 708 may be used at a residence, or on a vehicle such as a car, boat, aerostat, drone, airplane, and so forth.

The UT 708 includes a tracking system 782. The tracking system 782 uses almanac data 784 to determine tracking data 786. The almanac data 784 provides information indicative of orbital elements of the orbit 704 of one or more satellites 702. For example, the almanac data 784 may comprise orbital elements such as "two-line element" data for the satellites 702 in the constellation that are broadcast or otherwise sent to the UTs 708 using the communication system 780.

The tracking system 782 may use the current location of the UT 708 and the almanac data 784 to determine the tracking data 786 for the satellite 702. For example, based on the current location of the UT 708 and the predicted position and movement of the satellites 702, the tracking system 782 is able to calculate the tracking data 786. The tracking data 786 may include information indicative of azimuth, elevation, distance to the second satellite, time of flight correction, or other information at a specified time. The determination of the tracking data 786 may be ongoing. For example, the first UT 708 may determine tracking data 786 every 700 ms, every second, every five seconds, or at other intervals.

With regard to FIG. 7, an uplink is a communication link which allows data to be sent to a satellite 702 from a ground station 706, UT 708, or device other than another satellite 702. Uplinks are designated as UL1, UL2, UL3 and so forth. For example, UL1 is a first uplink from the ground station 706 to the second satellite 702(2). In comparison, a downlink is a communication link which allows data to be sent from the satellite 702 to a ground station 706, UT 708, or device other than another satellite 702. For example, DL1 is a first downlink from the second satellite 702(2) to the ground station 706. The satellites 702 may also be in communication with one another. For example, a crosslink 790 provides for communication between satellites 702 in the constellation.

The satellite 702, the ground station 706, the user terminal 708, the user device 710, the management system 750, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solidstate memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 8:
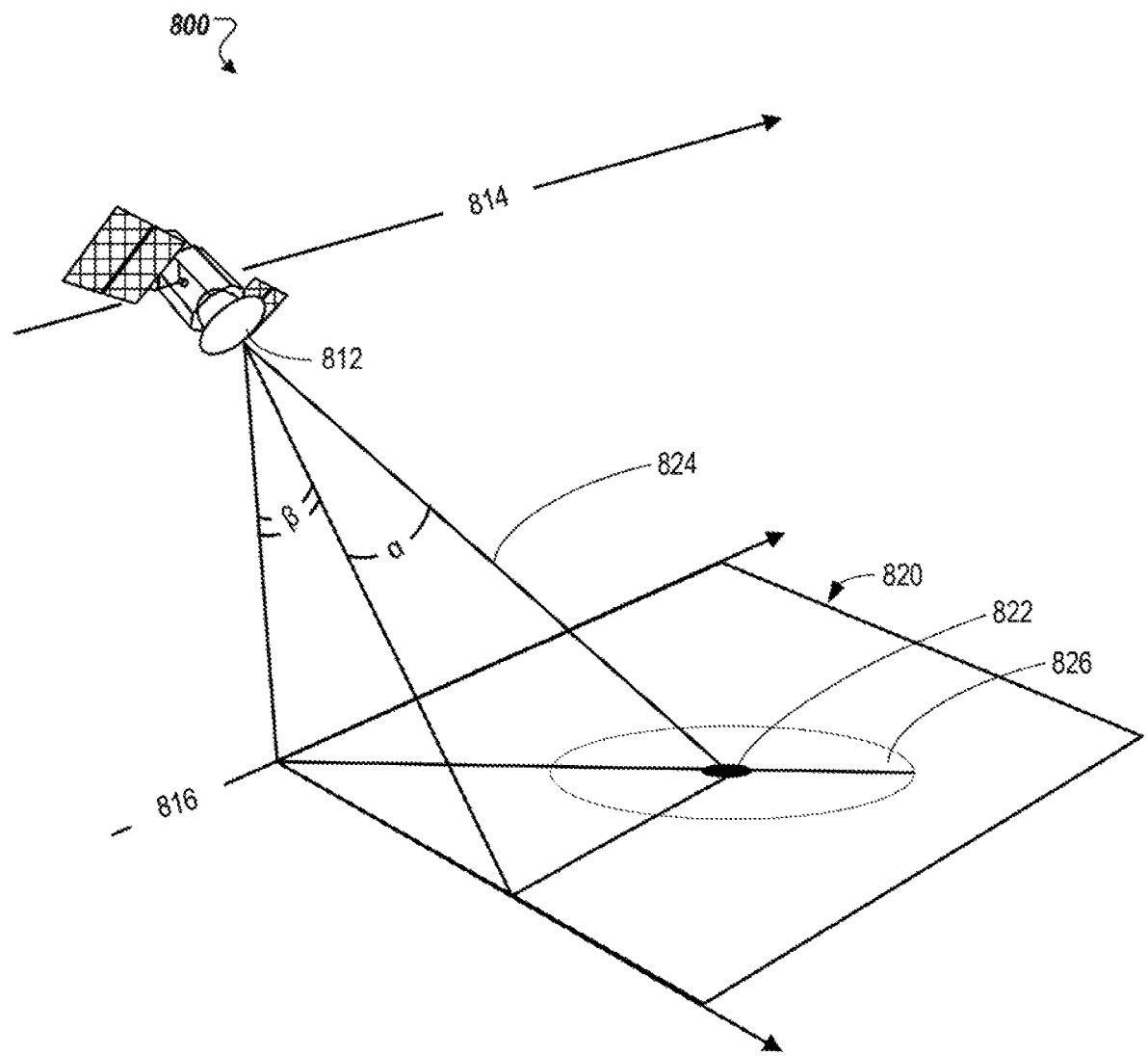
FIG. 8 illustrates a satellite including an antenna system that is steerable, according to embodiments of the present disclosure.

FIG. 8 illustrates the satellite 800 including an antenna system 812 that is steerable according to embodiments of the present disclosure. The satellite 800 can include can include the communication system 100, 200, and 600 of FIGS. 1, 2, and 6 as well as receiving circuit 400 of FIG. 4. The antenna system 812 may include multiple antenna elements that form an antenna and that can be mechanically or electrically steered individually, collectively, or a combination thereof. In an example, the antenna is a phased array antenna.

In orbit 704, the satellite 800 follows a path 814, the projection of which onto the surface of the Earth forms a ground path 816. In the example illustrated in FIG. 8, the ground path 816 and a projected axis extending orthogonally from the ground path 816 at the position of the satellite 800, together define a region 820 of the surface of the Earth. In this example, the satellite 800 is capable of establishing uplink and downlink communications with one or more of ground stations, user terminals, or other devices within the region 820. In some embodiments, the region 820 may be located in a different relative position to the ground path 816 and the position of the satellite 800. For example, the region 820 may describe a region of the surface of the Earth directly below the satellite 800. Furthermore, embodiments may include communications between the satellite 800, an airborne communications system, and so forth.

As shown in FIG. 8, a communication target 822 (e.g., a ground station, a user terminal, or a CT (such as an HD CT)) is located within the region 820. The satellite 800 controls the antenna system 812 to steer transmission and reception of communications signals to selectively communicate with the communication target 822. For example, in a downlink transmission from the satellite 800 to the communication target 822, a signal beam 824 emitted by the antenna system 812 is steerable within an area 826 of the region 820. In some implementations, the signal beam 824 may comprise a plurality of subbeams. The extents of the area 826 define an angular range within which the signal beam 824 is steerable, where the direction of the signal beam 824 is described by a beam angle "α" relative to a surface normal vector of the antenna system 812. In two-dimensional phased array antennas, the signal beam 824 is steerable in two dimensions, described in FIG. 8 by a second angle "β" orthogonal to the beam angle α. In this way, the area 826 is a two-dimensional area within the region 820, rather than a linear track at a fixed angle determined by the orientation of the antenna system 812 relative to the ground path 816.

In FIG. 8, as the satellite 800 follows the path 814, the area 826 tracks along the surface of the Earth. In this way, the communication target 822, which is shown centered in the area 826 for clarity, is within the angular range of the antenna system 812 for a period of time. During that time, signals communicated between the satellite 800 and the communication target 822 are subject to bandwidth constraints, including but not limited to signal strength and calibration of the signal beam 824. In an example, for phased array antenna systems, the signal beam 824 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 9:
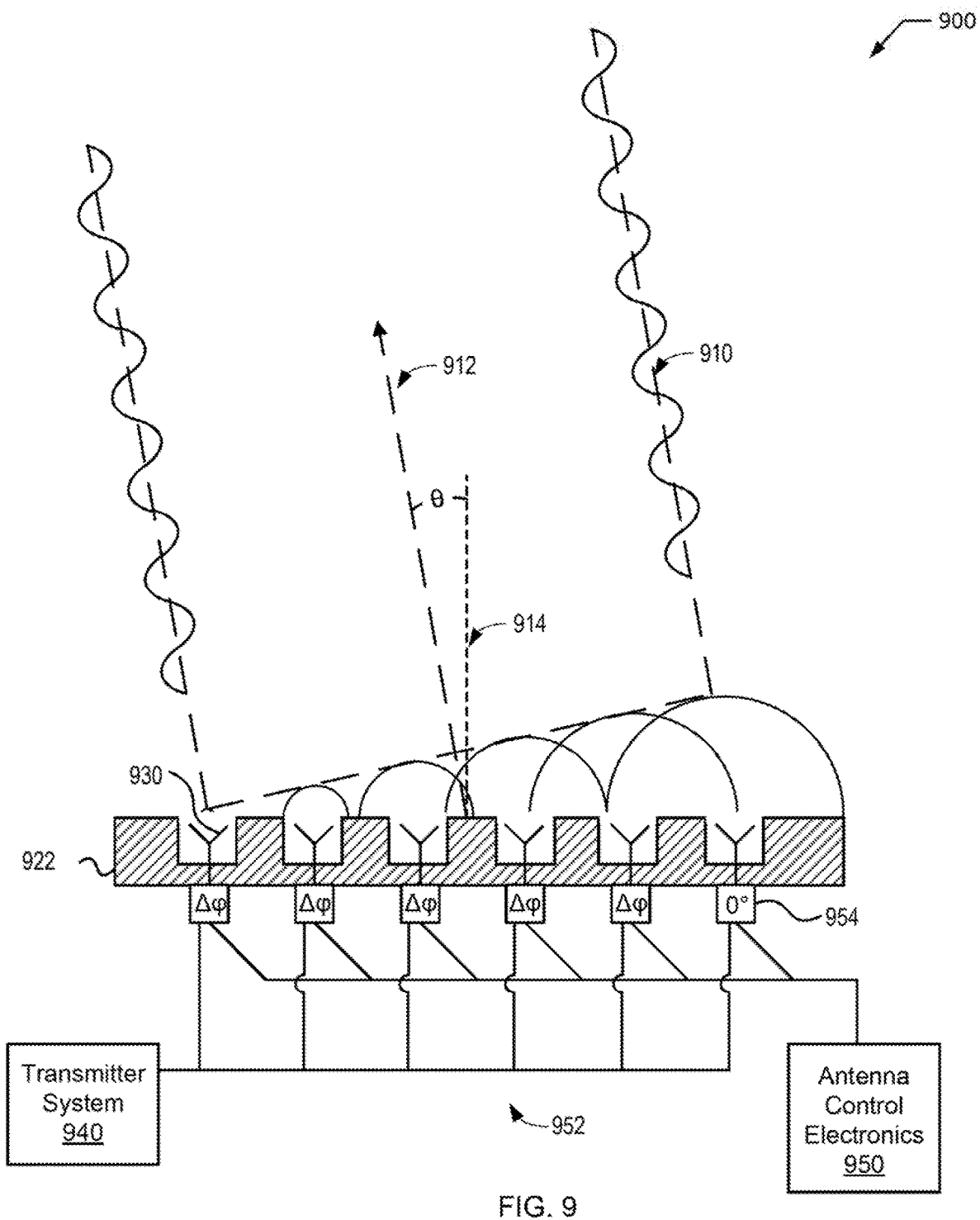
FIG. 9 illustrates a simplified schematic of an antenna, according to embodiments of the present disclosure.

FIG. 9 illustrates a simplified schematic of an antenna 900, according to embodiments of the present disclosure. The antenna 900 may be a component of the antenna system 812 of FIG. 8. As illustrated, the antenna 900 is a phased array antenna that includes multiple antenna elements 930 (e.g. antenna elements 102 in FIG. 1). Interference between the antenna elements 930 forms a directional radiation pattern in both transmitter and receiver arrays forming a beam 910 (beam extents shown as dashed lines). The beam 910 is a portion of a larger transmission pattern (not shown) that extends beyond the immediate vicinity of the antenna 900. The beam 910 is directed along a beam vector 912, described by an angle "θ" relative to an axis 914 normal to a surface of the antenna 900. As described below, the beam 910 is one or more of steerable or shapeable through control of operating parameters including, but not limited to a phase and an amplitude of each antenna element 930.

In FIG. 9, the antenna 900 includes, within a transmitter section 922, the plurality of antenna elements 930, which may include, but are not limited to, omnidirectional transmitter antennas coupled to a transmitter system 940, such as the downlink transmitter 778. The transmitter system 940 provides a signal, such as a downlink signal to be transmitted to a ground station on the surface. The downlink signal is provided to each antenna element 930 as a time-varying signal that may include several multiplexed signals. To steer the beam 910 relative to the axis 914, the phased array antenna system 900 includes antenna control electronics 950 controlling a radio frequency (RF) feeding network 952, including a plurality of signal conditioning components 954 interposed between the antenna elements 930 and the transmitter system 940. The signal conditioning components 954 introduce one or more of a phase modulation or an amplitude modulation (e.g. by phase shifters 108 in FIG. 1), as denoted by "Δφ" in FIG. 9, to the signal sent to the antenna elements 930. As shown in FIG. 9, introducing a progressive phase modulation produces interference in the individual transmission of each antenna element 930 that generates the beam 910.

The phase modulation imposed on each antenna element 930 can differ and can be dependent on a spatial location of a communication target that determines an optimum beam vector (e.g., where the beam vector 912 is found by one or more of maximizing signal intensity or connection strength). The optimum beam vector may change with time as the communication target 922 moves relative to the phased array antenna system 900.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
    an array antenna;
    a first digital beamforming (DBF) device coupled to a first set of antenna elements of the array antenna; and
    a second DBF device coupled to a second set of antenna elements of the array antenna, wherein:
    the first DBF device comprises:
        a first plurality of phase shifters, each coupled to one of the first set of antenna elements;
        a first combiner coupled to each of the first plurality of phase shifters, the first combiner to output a first signal;
        a first true-time delay (TTD) circuit coupled to the first combiner; and
        a first bypass circuit coupled to the first combiner;
    the second DBF device comprises:
        a second plurality of phase shifters, each coupled to one of the second set of antenna elements;
        a second combiner coupled to each of the second plurality of phase shifters, the second combiner to output a second signal;
        a second TTD circuit coupled to the second combiner; and
        a second bypass circuit coupled to the second combiner;
    wherein the first DBF device selectively enables the first TTD circuit and the second DBF device selectively enables the second TTD circuit to compensate for a relative time delay between the first signal and the second signal.

2. The communication system of claim 1, further comprising:
    a third combiner communicatively coupled to the first TTD circuit, the first bypass circuit, the second TTD circuit, and the second bypass circuit, wherein the third combiner receives signals processed by the first DBF device and the second DBF device and generates a combined signal.

3. The communication system of claim 2, wherein the third combiner is part of the second DBF device.

4. A receiver circuit comprising a first digital beamforming (DBF) device, the first DBF comprising:
    a first plurality of radio frequency (RF) ports;
    a first plurality of phase shifters;
    a first combiner coupled to each of the first plurality of phase shifters, the first combiner to output a first signal in a first mode and a second signal in a second mode; and
    first delay circuitry coupled to the first combiner and to receive the first signal and the second signal from the first combiner, wherein:
        in the first mode, the first delay circuitry does not delay the first signal; and
        in the second mode, the first delay circuitry delays the second signal by a first time duration.

5. The receiver circuit of claim 4, wherein the first delay circuitry comprises:
    a true-time delay (TTD) circuit; and
    a bypass circuit coupled in parallel to the TTD circuit, wherein the bypass circuit is enabled in the first mode to cause the first signal to bypass the TTD circuit.

6. The receiver circuit of claim 4, wherein:
    the first DBF device further comprises a second combiner coupled to the first delay circuitry and a second delay circuitry of a second DBF device; and
    in the first mode, the second combiner generates a third signal by combining the first signal and a fourth signal received from the second delay circuitry; and
    in the second mode, the second combiner generates a fifth signal by combining the second signal and a sixth signal received from the second delay circuitry.

7. The receiver circuit of claim 4, wherein:
the first DBF device further stores second information corresponding to the first plurality of phase shifters; and
the first plurality of phase shifters align a relative phase shift between signals received from a first set of antenna elements using the second information.

8. The receiver circuit of claim 4, wherein the first DBF device further comprises a digital processing circuit comprising:
a first digital signal processing (DSP) engine that implements the first combiner, and the first delay circuitry; and
a second DSP engine that implements the first plurality of phase shifters.

9. The receiver circuit of claim 8, wherein the second DSP engine stores second information corresponding to the first plurality of phase shifters, wherein each of the first plurality of phase shifters adjust a phase of a signal, received from a respective one of a first set of antenna elements, based on the second information.

10. The receiver circuit of claim 8, wherein the first DBF device further comprises:
an RF down converter coupled to one of the plurality of RF ports, the RF down converter receives an RF signal from a respective one of a first set of antenna elements and down converts the RF signal from a first frequency to a second frequency that is lower than the first frequency; and
an analog-to-digital converter (ADC) coupled to the RF down converter and the second DSP engine, wherein the ADC receives the RF signal from the RF down converter, generates samples of the RF signal, and outputs the samples to the second DSP engine.

11. The receiver circuit of claim 8, wherein the second DSP engine comprises a channelizer function and an amplitude shaping function to process samples on a beam basis before being adjusted by the first plurality of phase shifters, wherein the first plurality of phase shifters are allocated on the beam basis.

12. The receiver circuit of claim 4, further comprising:
a second DBF device comprising a second combiner and second delay circuitry, the second delay circuitry to output a third signal in the first mode and a fourth signal in the second mode; and
a third combiner coupled to the first delay circuitry and the second delay circuitry, wherein:
in the first mode, the third combiner generates a fifth signal by combining the first signal and third signal; and
in the second mode, the third combiner generates a sixth signal by combining the second signal and fourth signal.

13. The receiver circuit of claim 12, wherein the third combiner is part of the first DBF device.

14. The receiver circuit of claim 4, wherein the first DBF device further comprises:
a second plurality of RF ports;
a second plurality of phase shifters, each coupled to one of the second plurality of RF ports;
a second combiner coupled to each of the second plurality of phase shifters, the second combiner to output a third signal in the first mode and a fourth signal in the second mode; and
second delay circuitry coupled to the second combiner, wherein:
in the first mode, the second delay circuitry does not delay the third signal; and
in the second mode, the second delay circuitry delays the fourth signal by a second time duration.

15. The receiver circuit of claim 14, wherein:
the first DBF device further comprises a third combiner coupled to the first delay circuitry and the second delay circuitry;
in the first mode, the third combiner generates a fifth signal by combining the first signal and the third signal; and
in the second mode, the third combiner generates a sixth signal by combining the second signal and the fourth signal.

16. A communication system comprising:
an antenna array; and
a first receiver circuit coupled to the antenna array, the first receiver circuit comprising:
an analog-to-digital converter (ADC) to generate first samples of a first signal received from a first antenna element of the antenna array and second samples of a second signal received from a second antenna element of the antenna array; and
a digital processing circuit coupled to the ADC, the digital processing circuit comprising a first phase shifter, a second phase shifter, a combiner, and a time delay element, wherein the digital processing circuit operates in a first mode or a second mode, wherein the digital processing circuit is to:
process the first samples using the first phase shifter;
process the second samples using the second phase shifter; and
generate third samples by combining the first samples and the second samples; and
delay the third samples by a first time duration using the time delay element only while the digital processing circuit operates in the second mode.

17. The communication system of claim 16, further comprising a second receiver circuit coupled to the antenna array, the second receiver circuit comprising:
a second ADC to generate fourth samples of a third signal received from a third antenna element of the antenna array and fifth samples of a fourth signal received from a fourth antenna element of the antenna array; and
a second digital processing circuit coupled to the second ADC, the second digital processing circuit comprising a third phase shifter, a fourth phase shifter, a second combiner, and a second time delay element, wherein the second digital processing circuit operates in the first mode or the second mode, wherein the second digital processing circuit is to:
process the fourth samples using the third phase shifter;
process the fifth samples using the fourth phase shifter; and
generate sixth samples by combining the fourth samples and the fifth samples; and
delay the sixth samples by a second time duration using the second time delay element only while the second digital processing circuit operates in the second mode.

18. The communication system of claim 17, wherein the digital processing circuit further comprises a third combiner, wherein the digital processing circuit generates seventh samples by combining the third samples and the sixth samples.

19. The communication system of claim 16, wherein the first receiver circuit comprises:

first information indicative of the first mode or the second mode, wherein the first mode is enabled for beam scan angles that are equal to or less than a threshold value and the second mode is enabled for beam scan angles that are greater than the threshold value; and second information corresponding to the first time duration.

20. The communication system of claim 16, wherein the first receiver circuit comprises:

a third register to store second information corresponding to a first amount of phase adjustment to be applied to the first samples by the first phase shifter; and a fourth register to store third information corresponding to a second amount of phase adjustment to be applied to the second samples by the second phase shifter.

\* \* \* \* \*